Oct. 20, 1942.　　　　E. C. AMSDEN　　　　2,299,121
METHOD OF MAKING GUARDS FOR ATTACHMENT TO AUTOMOBILE BUMPERS
Filed May 25, 1940　　　2 Sheets-Sheet 2

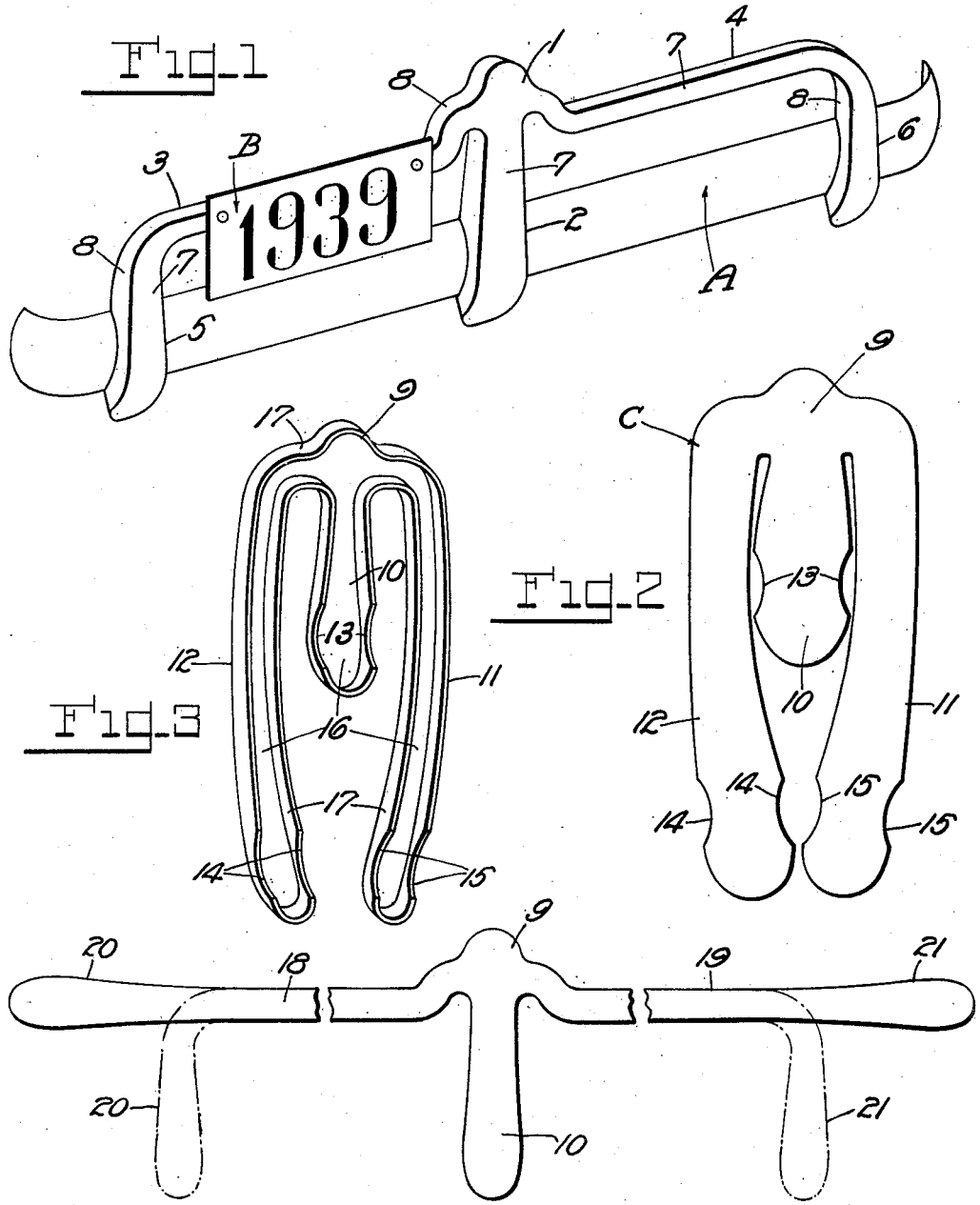

INVENTOR
Eugene C. Amsden
by Dike, Calver & Gray
Attys.

Patented Oct. 20, 1942

2,299,121

UNITED STATES PATENT OFFICE 2,299,121

METHOD OF MAKING GUARDS FOR ATTACHMENT TO AUTOMOBILE BUMPERS

Eugene C. Amsden, Cambridge, Mass., assignor of one-half to Howard L. Blackwell, Cambridge, Mass.

Application May 25, 1940, Serial No. 337,251

3 Claims. (Cl. 29—152)

This invention relates to a novel type of guard for attachment to the bumpers of automobiles and the method of making them.

When bumpers, and especially resilient bumpers, became standard equipment on automobiles, drivers began to experience considerable difficulty from interlocking. Resilient bumpers are often arcuate in cross-section, with the convex surface outward. When two vehicles meet, these convex surfaces facilitate locking, whereby one bumper is forced over another and passes slightly beyond it, the edges thereupon binding and preventing removal. To overcome this difficulty, guards were devised, the object being to erect a barrier sufficient to prevent one bumper from sliding over another and becoming locked. These guards serve to protect automobile fenders when properly placed, and now that extended radiator grills are used these guards are also used to shield the radiator grills. These guards originally and usually took the form of one or more vertical pieces of metal or posts bolted on appropriate parts of the bumper. They had to be strong, and fit securely on the outer convex surface of the bumper. Horizontal tie rods connecting the posts have been used to give additional protection to the grill, strengthen the posts and also serve as ornamentations and as supports for number plates.

Although these guards are very useful, ornamental and popular, the most useful and attractive types have had only a limited use, chiefly because of the high cost of manufacture.

I have now succeeded in making a very considerable improvement in such guards. My new improved form is stronger, more attractive, and less expensive to make. I have also invented an entirely new method of making such guards which is simpler, easier and less costly than any before used. When guards are made according to my new method there is less waste of material, much time is saved and the product is not only less expensive but is stronger and more attractive.

My new device in its preferred form is an integrally-formed, horizontally-braced, triple-post guard of flanged steel, stronger but lighter and less expensive to make than any now known to me. Three flanged posts, the parts that prevent interlocking, are connected by an integrally formed, flanged horizontal bar. There is no need for weakening holes, for connecting bolts and nuts, or for soldering, welding, or riveting.

The term "post" is used to signify that part of the guard which comes in contact with the bumper of an automobile. Many of the guards of the prior art were merely such posts with nothing more. When the term "vertical portion" is used herein, it refers to these post portions, which are disposed in an upright or vertical position when mounted on an automobile bumper. In like manner, the portion of the guard that serves to connect and brace the posts is referred to as a horizontal portion or laterally extending portion due to its position when in use. The words "horizontal" and "vertical" are purely descriptive, and it is obvious that a considerable amount of variation is possible without affecting the utility of the device.

The invention will best be understood from the following description in conjunction with the accompanying drawings. It is to be understood that the invention is not limited to the details of construction and arrangement of parts illustrated in the drawings, since the invention as defined by the claims hereinafter appended, may be otherwise embodied without departure from the spirit and scope thereof.

It is also to be understood that the terms here used are for the purpose of description and not of limitation, and it is not intended to limit the invention claimed herein beyond the requirements of the prior art.

In the accompanying drawings:

Fig. 1 is a view in perspective of a device embodying my invention shown attached to a bumper and supporting a number-plate as in actual use.

Fig. 2 is a plan view of a sheet metal blank from which the device of Fig. 1 is constructed.

Fig. 3 is a perspective view of the blank after it has been flanged.

Fig. 4 is a view showing the arms spread laterally, with their end portions bent substantially at right angles thereto as shown by dot-and-dash lines.

Figure 5:
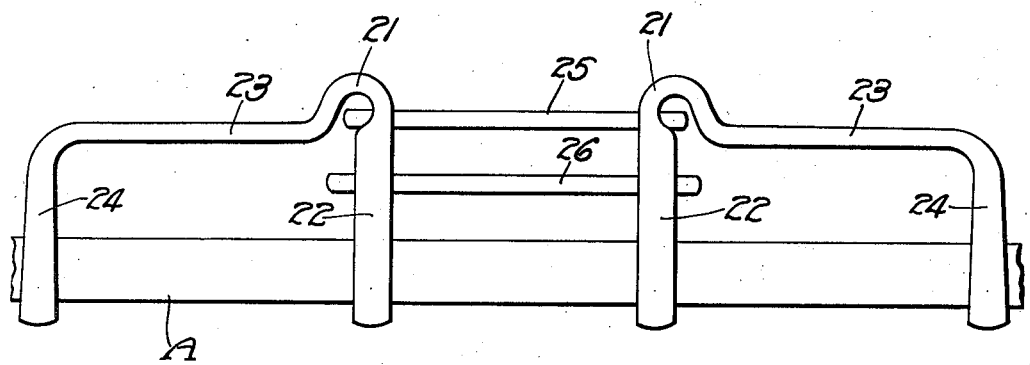
Fig. 5 is a front elevation of a modified form of my invention, shown attached to a bumper.

In Fig. 1 of the drawings, my device in its preferred form is shown attached to an automobile bumper A and bearing a number plate B. The device comprises a main body portion 1 from which extend integrally-formed portions 2, 3 and 4. The portion 2 depends from the body portion 1 and constitutes a post capable of attachment to the bumper A. The portions 3 and 4 extend laterally from opposite sides of the body portion 1 and constitute substantially horizontal arms or connecting members for posts 5 and 6 which are formed by bending the end portions of the arms 3 and 4 substantially at right angles thereto to form depending portions substantially parallel to the post 2. Thus the posts 2, 5 and 6 constitute substantially vertical guard portions which are interconnected by the arms 3 and 4 to form an integrally constructed device. Each of said posts is attached to the bumper A in some suitable manner not shown because not related to the present invention. All parts of the device have a face portion or surface 7 and a turned-in portion or flange 8.

That portion of the guard which is here designated as the main body portion 1 is not capable of precise definition and this description is chiefly one of convenience intended to refer to that portion of the device which cannot be classified as a post or a connecting arm but which serves as a junction for these appendages in their various forms.

Figs. 2, 3 and 4 illustrate the method by which my preferred form of bumper guard is made. A sheet of metal of any sufficient size may be used, but in actual manufacture it is convenient to use a sheet the width of the blank to be formed and the length of several such blanks. This sheet of metal is pierced, as by punching or cutting, to form the blank generally denoted by the letter C as shown in Fig. 2. This blank is a flat piece of thin gauge metal having a main body portion 9 and projections or extensions 10, 11 and 12. Those parts of the device which will later come in contact with the convex bumper A may at this time be indented or cut away as shown by the matched depressions 13—13, 14—14, and 15—15. In this event this shaping or cutting can be performed as a part of the first step of punching by which the blank is formed. It is not, however, necessary to provide such curved surfaces or indentations at this time, as they may be formed during the flanging or pressing which constitutes the next step of the process. As shown in Fig. 3, the edges of the blank C are pressed to form flanges. In this manner the flat blank is converted into a channeled structure having a face portion 16 and a flange portion 17 on all borders of the face portion.

The last step is to bend the blank as shown in Fig. 4. The main body portion 9 and the portion 10 remain unchanged, but the flanged portions 11 and 12 are now spread or bent outwardly away from the portions 9 and 10 to form the laterally extending arms 18 and 19. At the same time, or subsequently, according to convenience, the distal portions 20 and 21 of the arms 18 and 19 are bent downwardly, as shown by the dot-and-dash lines. When this final operation is completed, the device becomes the finished guard shown in Fig. 1.

It will thus be evident that the process comprehends the important steps of piercing a sheet of metal to form a blank of the desired shape, pressing said blank to form flanges on the edges thereof and then bending to form side arms and side posts integrally connected with each other and the main body portion.

It is apparent that this method may be modified without departing from the essential features of my invention. Thus, the first step, here generally referred to as piercing, may in practice be performed as a series of steps. The metal sheet may be cut in sections in a manner designed to form the silhouette of the blank, the waste material may be punched out of the interior of the blank, and, in the event that the blank is not yet fully formed, additional cutting may be done. These operations are all obvious expedients which do not differ in their result from forming the blank in one operation, and the terms punching, cutting and forming herein used to describe the first step of the process are intended to embrace all such piercing operations in their entirety.

The last step, that of bending, may also for the sake of convenience be divided into two operations, generally described as spreading to form lateral extensions and then bending the distal or outer ends thereof to form posts. This double bending operation may be performed either simultaneously or separately to suit the convenience, but there is no difference in effect, and this double bending whether simultaneously or not is understood to be comprehended in the term bending.

Fig. 5 shows a modified form of my device which embraces the use of two guard sections. Each section is made in accordance with the above disclosed method and then joined to the other of the pair by tie-rods. In Fig. 5, each section has a main body portion 21, a post 22 and an extended arm portion 23 the distal part of which is bent to form a post 24. The sections are joined by tie-rods 25 and 26 and mounted on an automobile bumper A.

When one of the guard sections shown in Fig. 5 is compared with the preferred form shown in Fig. 1, it will be seen that the shape and position of the main body portions or points of junction 1 and 21 are important in determining the form of the guard. What may on casual inspection appear to be radical departures from the devices here shown embodying my invention can be easily seen to be closely related to them if the importance of the shape and position of the main body portion or point of junction is kept in mind.

Thus, it is obvious that a device embodying my invention may be made which may omit the center post 2 shown in Fig. 1. In this event, the blank C shown in Fig. 2 is formed without the central portion 10. The two-post blank so formed could be flanged and bent, and two such structures could be attached to an automobile bumper and connected by tie-rods. Then the only material difference between this supposed device and the modified device of Fig. 5 lies in the location of the main body portion or point of junction. In the supposed device, the said body portion would be located equidistant from the end arms as in Fig. 1, where the body portion 1 is substantially equally distant from arms 5 and 6. In the modification shown in Fig. 5, the junction 21 is adjacent to the post 22 and spaced considerably from the post 24. In the supposed device, two arms would be spread laterally an equal distance and then bent, while in the device of Fig. 5, only one arm need be spread away and bent, one post being complete when flanged.

It may also be observed that one of the sections of the device of Fig. 5 can be formed by splitting the blank C of Fig. 2 vertically through its axis and then continuing to perform the process on the separated halves. These completed halves, when joined by tie-rods, would be almost identical with the device of Fig. 5.

It may further be noted that the arms 23 of the device of Fig. 5 may be joined to an intermediate portion of the posts 22, rather than at the top as shown. By so doing, the tie rod 25 may pass through a portion of the posts 22 above the joint of junction 21. One of the advantages of the four-post, two-section device of Fig. 5 is adjustability; the minor variation here noted will tend to increase the extent of adjustment.

Figure 6:
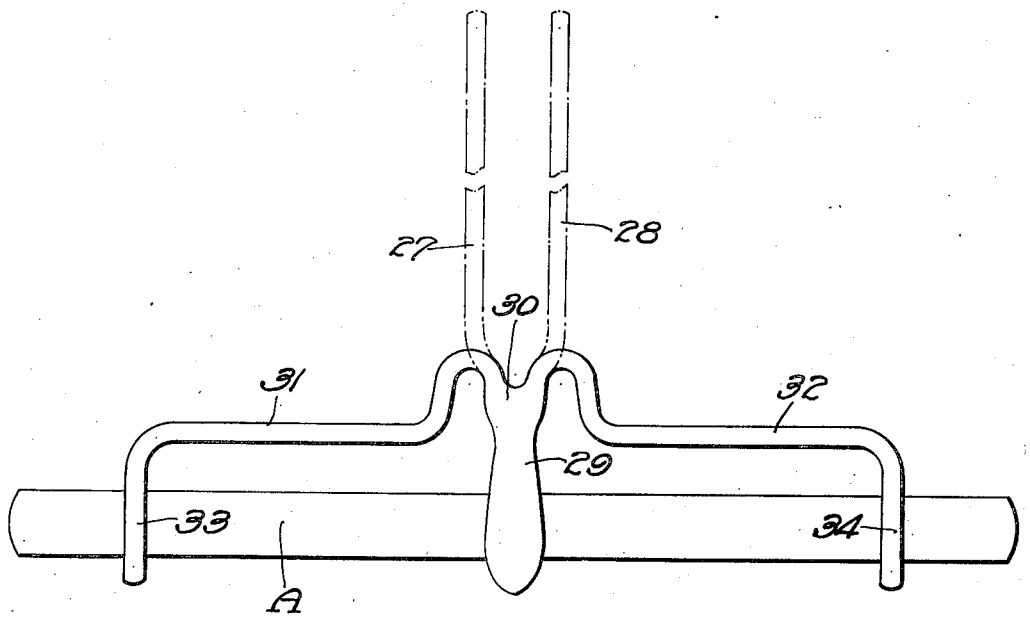
Fig. 6 is a front elevation of a second modified form of my invention, showing the positions of the arms before and after spreading.

In Fig. 6, a three-post device similar to that shown in Fig. 1 is given a slightly different appearance by spreading outwardly and downwardly instead of outwardly and upwardly. Here the central post 29 is formed from the lower instead of the upper portion of the blank, the bottom of the post forming the extreme end of the blank and the body portion or head of the post 30, where the arms are attached, is formed from the mid section of the blank. The upper portion of the blank, approximately two thirds thereof, is punched or cut to form the arms 27 and 28 shown in dot-and-dash lines in Fig. 6. After the blank has been flanged, the arms 27 and 28 are spread and bent to the position shown in full lines. The device then has a central post 29, arms 31 and 32 extending from the junction portion or body 30, and posts 33 and 34 formed by bending down a distal portion of said arms. The posts 29, 33 and 34 are mounted on an automobile bumper A in any suitable manner.

Each device embodying my invention has been considered as a single guard, but each device can be considered as corresponding to an entire set of the guards heretofore known in the art. All of the many separate posts and braces heretofore used on a single bumper, and considered as a complete set, may now be replaced by the single, unitary structure of my invention. Only one set of dies need be used, and each use contributes to the formation of not one, but of all the elements normally required. Flanging also is accomplished for all elements in a single operation. In effect, a whole set of guards, but in a stronger, unitary form, may now according to my invention be formed as easily as a single element was formed by the methods heretofore known.

I claim:

1. Method of making a bumper guard having spaced mounting posts connected at one end thereof by a bar with a central transverse reenforcement piece, comprising the steps of forming a U-shaped blank whose yoke is to form said transverse piece, bending all edges of the blank in the same general direction to form an endless depending flange on the blank, spreading the legs of the flanged U-shaped blank in the plane of the latter into substantial longitudinal alignment, and then bending opposite end portions of the spread legs in the plane of the blank into depending mounting posts.

2. Method of making a bumper guard having three equally spaced mounting posts connected at one end thereof by a bar, comprising the steps of forming a U-shaped blank whose yoke is partly slit apart from the legs thereof to form a tongue between the latter, bending all edges of the blank in the same general direction to form an endless depending flange on the blank whose flanged tongue is the intermediate mounting post, spreading the legs of the flanged U-blank in the plane of the latter into substantial longitudinal alignment, and then bending opposite end portions of the spread legs in the plane of the blank into the outer, depending mounting posts.

3. Method of making a bumper guard having spaced mounting posts connected at one end thereof by a bar with a central transverse reenforcement piece, comprising the steps of forming a U-shaped blank whose yoke is to form said transverse piece, bending all edges of the blank into an endless depending flange thereon such that the junction between said yoke and each leg of the U-blank in the plane of the latter is curved, spreading the legs of the flanged U-blank in the plane of the latter into substantial longitudinal alignment whereby said curved junctions are extended at reversed curvature to the spread legs, and then bending opposite end portions of the spread legs in the plane of the blank into depending mounting posts.

EUGENE C. AMSDEN.